(12) United States Patent
Suo (10) Patent No.: US 12,169,613 B2
(45) Date of Patent: Dec. 17, 2024

(54) DISPLAY PANEL, METHOD FOR DRIVING DISPLAY PANEL, AND DISPLAY APPARATUS

(71) Applicants: WUHAN TIANMA MICROELECTRONICS CO., LTD., Wuhan (CN); Wuhan Tianma Microelectronics Co., Ltd. Shanghai Branch, Shanghai (CN)

(72) Inventor: Lei Suo, Wuhan (CN)

(73) Assignees: Wuban Tianma Microelectronics Co., Ltd., Wuhan (CN); Wuhan Tianma Microelectronics Co., Ltd. Shanghai Branch, Pudong New District (CN)

( * ) Notice: Subject to any disclaimer, the term of this patent is extended or adjusted under 35 U.S.C. 154(b) by 133 days.

(21) Appl. No.: 17/713,618

(22) Filed: Apr. 5, 2022

(65) Prior Publication Data

US 2022/0229501 A1 Jul. 21, 2022

(30) Foreign Application Priority Data

Jan. 24, 2022 (CN) .......................... 202210077655.3

(51) Int. Cl.
*G06F 3/042* (2006.01)
*G06F 3/041* (2006.01)
*G09G 3/3291* (2016.01)

(52) U.S. Cl.
CPC .......... *G06F 3/042* (2013.01); *G06F 3/04164* (2019.05); *G09G 3/3291* (2013.01); *G09G 2354/00* (2013.01); *G09G 2360/148* (2013.01)

(58) Field of Classification Search
CPC ... G06F 3/042; G06F 3/04164; G09G 3/3291; G09G 2354/00; G09G 2360/148
See application file for complete search history.

(56) References Cited

U.S. PATENT DOCUMENTS

2021/0225286 A1* 7/2021 Wang ................... G09G 3/3258
2021/0264823 A1* 8/2021 Heo ..................... H01L 27/1214

FOREIGN PATENT DOCUMENTS

| CN | 102165577 A | 8/2011 |
| CN | 103309507 A | 9/2013 |
| CN | 107329620 A | 11/2017 |
| WO | 2021077331 A1 | 4/2021 |

OTHER PUBLICATIONS

Chinese Office Action mailed Sep. 4, 2023, issued in related Chinese Application No. 2022100776553 filed Jan. 24, 2022, 12 pages.

* cited by examiner

*Primary Examiner* — Kenneth B Lee, Jr.
(74) *Attorney, Agent, or Firm* — Christensen O'Connor Johnson Kindness PLLC (57) ABSTRACT

A display panel and a method for driving the same, and a display apparatus are provided. The display panel includes at least one pixel circuit, at least one light-emitting device coupled to the pixel circuit, at least one data line, and a first voltage signal line. One pixel circuit of the at least one pixel circuit includes a data writing transistor and a photodiode. The data writing transistor includes a first electrode coupled to one of the at least one data line, and a second electrode coupled to a first electrode of the photodiode. The photodiode includes a second electrode coupled to the first voltage signal line.

19 Claims, 7 Drawing Sheets

DISPLAY PANEL, METHOD FOR DRIVING DISPLAY PANEL, AND DISPLAY APPARATUS

CROSS-REFERENCE TO RELATED APPLICATION

The present application claims priority to Chinese Patent Application No. 202210077655.3, filed on Jan. 24, 2022, the content of which is incorporated herein by reference in its entirety.

TECHNICAL FIELD

The present disclosure relates to the technical field of display, and in particular, to a display panel, a method for driving a display panel, and a display apparatus.

BACKGROUND

With the development of display technology, the application of styluses in the field of display has enriched human-computer interaction. Some electronic device manufacturers have proposed styluses for large-screen devices. There are two main types of styluses in the market, i.e., passive capacitive stylus and active capacitive stylus. The passive capacitive stylus uses the tip of the stylus to simulate the touch effect of the finger, has a tip made of a conductive material, and needs to be provided with a relatively wide tip. The active capacitive stylus uses an active electrical signal emitted by the stylus to simulate the effect of large-area contact. A touch detection circuit is integrated in the display apparatus, and the touch detection circuit cooperates with the stylus to realize a touch function. The current stylus has a large tip size and a low touch accuracy, which cause poor user experience.

SUMMARY

According to a first aspect, some embodiments of the present disclosure provide a display panel. The display panel includes at least one pixel circuit, at least one light-emitting device coupled to the pixel circuit, at least one data line, and a first voltage signal line. One pixel circuit of the at least one pixel circuit includes a data writing transistor and a photodiode. The data writing transistor includes a first electrode coupled to one of the at least one data line, and a second electrode coupled to a first electrode of the photodiode. The photodiode includes a second electrode coupled to the first voltage signal line.

According to a second aspect, some embodiments of the present disclosure further provide a method for driving a display panel. The display panel includes at least one pixel circuit, at least one light-emitting device coupled to the pixel circuit, at least one data line, and a first voltage signal line. One pixel circuit of the at least one pixel circuit includes a data writing transistor and a photodiode. The data writing transistor includes a first electrode coupled to one of the at least one data line, and a second electrode coupled to a first electrode of the photodiode. The photodiode includes a second electrode coupled to the first voltage signal line. The method includes: controlling the data writing transistor to be turned on, and detecting a voltage value on one data line of the at least one data line; and determining a position of an optical touch signal based on the voltage value.

According to a third aspect, some embodiments of the present disclosure further provide a display apparatus including a display panel. The display panel includes at least one pixel circuit, at least one light-emitting device coupled to the pixel circuit, at least one data line, and a first voltage signal line. One pixel circuit of the at least one pixel circuit includes a data writing transistor and a photodiode. The data writing transistor includes a first electrode coupled to one of the at least one data line, and a second electrode coupled to a first electrode of the photodiode. The photodiode includes a second electrode coupled to the first voltage signal line.

BRIEF DESCRIPTION OF DRAWINGS

To describe the technical solutions in the embodiments of the present disclosure or the related art more clearly, the following briefly describes the accompanying drawings required for describing the embodiments or the related art. The accompanying drawings in the following description show some embodiments of the present disclosure, and a person skilled in the art can still derive other drawings from these accompanying drawings.

DESCRIPTION OF EMBODIMENTS

In order to make technical solutions and advantages of the embodiments of the present disclosure more clear, the technical solutions in the embodiments of the present disclosure will be clearly and completely described below in conjunction with the accompanying drawings in the embodiments of the present disclosure. The described embodiments are some, rather than all of the embodiments of the present disclosure. All other embodiments obtained by a person of ordinary skill in the art based on the embodiments of the present disclosure shall fall within the protection scope of the present disclosure.

Terms in the embodiments of the present disclosure are merely used to describe the embodiments, and are not intended to limit the present disclosure. Unless otherwise specified in the context, words, such as "a", "the", and "this", in a singular form in the embodiments of the present disclosure and the appended claims include plural forms.

The capacitive stylus in the related art simulates the touch effect of human hands to achieve the touch function. The tip of the stylus needs to have a large enough area. The actual contact area between the tip and the display is also large, resulting in low touch accuracy and failing to achieve pixel-level positioning of the touch position, which affects the user experience. Using the touch recognition method in the related art, the tip of the stylus needs to be in contact with the display screen. The tip of the stylus is usually made of metal, which will cause wear and tear on the screen after multiple touch operations.

An embodiment of the present disclosure provide a display panel, a pixel circuit of the display panel is improved, a photodiode is integrated in the pixel circuit, and an optical touch signal is detected by the pixel circuit, which can realize pixel-level positioning for the touch signal, increase the accuracy of touch detection, and improve the user experience.

The display panel provided by embodiments of the present disclosure includes a pixel circuit and a light-emitting device coupled to the pixel circuit. In some embodiments, the light-emitting device is an organic light emitting diode. In other embodiments, the light-emitting device is an inorganic light emitting diode. The photodiode is integrated in the pixel circuit. The photodiode is coupled to the data line through a data writing transistor. When the data writing transistor is turned on, the photodiode is controlled to operate under a reverse voltage. With irradiation, the carrier concentration in an anode region and a cathode region of the photodiode is improved to form a photocurrent, and the photocurrent will cause a voltage on the data line to change. Detection of the optical touch position can be implemented by detecting the change of the voltage signal on the data line.

The photodiode includes an anode and a cathode. When operating under a reverse voltage, the photodiode will generate a photocurrent after receiving light. In the embodiments of the present disclosure, a first electrode of the photodiode is coupled to the data line through the data writing transistor, and a second electrode of the photodiode is coupled to a first voltage signal line, so that when the data writing transistor is turned on, the photodiode can operate under a reverse voltage. In some embodiments, the first voltage signal line can be a signal line additionally provided in the display panel. In other embodiments, the first voltage signal line is coupled to the photodiode, and is also reused as a reset signal line or a power signal line in the display panel.

An optical touch function can be implemented through interaction between the laser pointer and the display panel. The laser pointer does not need to be in contact with the display panel, so that the optical touch function does not cause wear and tear of the display panel. After laser light emitted by the laser pointer is incident on the display panel, a bright spot will be formed on the display panel. In other words, whether a light-emitting device at a position irradiated by the laser pointer can emit light normally or not does not affect the overall display screen.

The present disclosure will be illustrated below through some embodiments.

Figure 1:
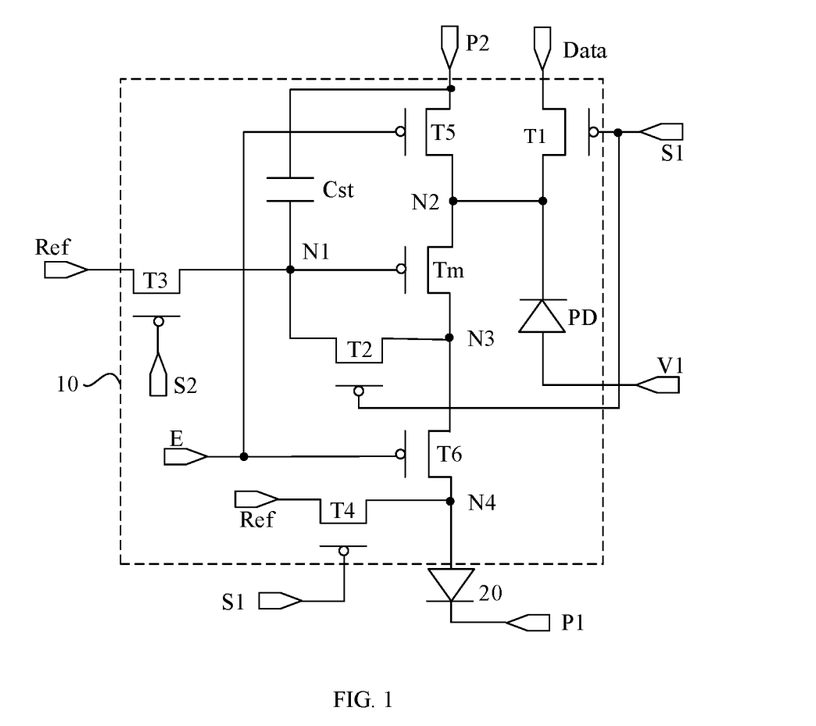
FIG. 1 is a schematic circuit diagram of a display panel according to an embodiment of the present disclosure.
Figure 2:
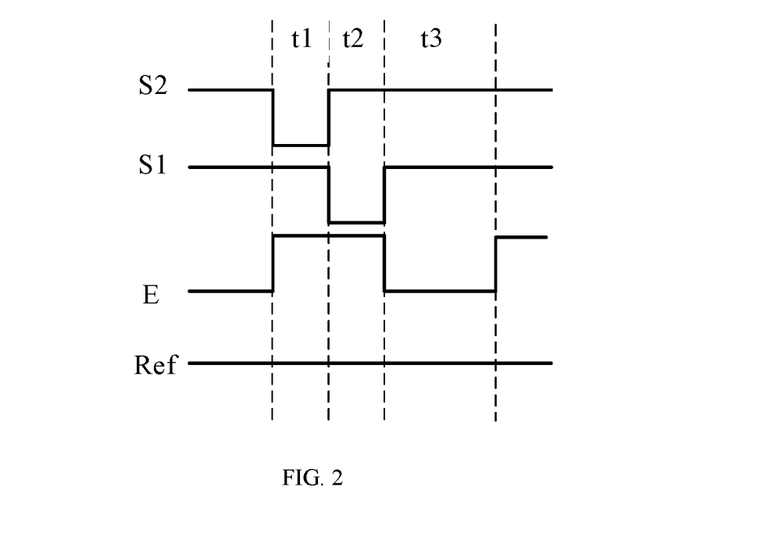
FIG. 2 is a sequence diagram of a pixel circuit according to an embodiment of the present disclosure.

FIG. 1 is a schematic circuit diagram of a display panel according to an embodiment of the present disclosure. FIG. 2 is a sequence diagram of a pixel circuit according to an embodiment of the present disclosure.

As shown in FIG. 1, a pixel circuit 10 is coupled to a light-emitting device 20. The pixel circuit 10 includes a drive transistor Tm, a data writing transistor T1, a threshold compensation transistor T2, a node reset transistor T3, an electrode reset transistor T4, a first light-emitting control transistor T5, a second light-emitting control transistor T6, and a storage capacitor Cst.

The display panel includes a data line Data, a first scanning signal line S1, a second scanning signal line S2, a reset signal line Ref, a light-emitting control line E, a first power signal line P1, and a second power signal line P2.

A control electrode of the drive transistor Tm is coupled to a first node N1, a first electrode of the drive transistor Tm is coupled to a second node N2, and a second electrode of the drive transistor Tm is coupled to a third node N3. A control electrode of the node reset transistor T3 is coupled to the second scanning signal line S2, a first electrode of the node reset transistor T3 is coupled to the reset signal line Ref, and a second electrode of the node reset transistor T3 is coupled to the first node N1. A control terminal of the data writing transistor T1 is coupled to the first scanning signal line S1, a first electrode of the data writing transistor T1 is coupled to the data line Data, and a second electrode of the data writing transistor T1 is coupled to the second node N2. The threshold compensation transistor T2 is connected in series between the first node N1 and the third node N3, and a control electrode of the threshold compensation transistor T2 is coupled to the first scanning signal line S1. A control electrode of the electrode reset transistor T4 is coupled to the first scanning signal line S1, a first electrode of the electrode reset transistor T4 is coupled to the reset signal line Ref, and a second electrode of the electrode reset transistor T4 is coupled to the fourth node N4. A control electrode of the first light-emitting control transistor T5 and a control electrode of the second light-emitting control transistor T6 are both coupled to the light-emitting control line E. A first electrode of the first light-emitting control transistor T5 is coupled to the second power signal line P2, and a second electrode of the first light-emitting control transistor T5 is coupled to the second node N2. A first electrode of the second light-emitting control transistor T6 is coupled to the third node N3, and a second electrode of the second light-emitting control transistor T6 is coupled to the fourth node N4. A first electrode of the light-emitting device 20 is coupled to the fourth node N4, and a second electrode of the light-emitting device 20 is coupled to the first power signal line P1; one electrode plate of the storage capacitor Cst is coupled to the second power signal line P2, and another electrode plate of the storage capacitor Cst is coupled to the first node N1.

The light-emitting device 20 includes a first electrode, a light-emitting layer, and a second electrode. For example, if the first electrode of the light-emitting device 20 is an anode, the first power signal line P1 is a cathode power signal line, and the second power signal line P2 is an anode power signal line. In some embodiments, if the first electrode of the light-emitting device 20 is a cathode, the first power signal line P1 is an anode power signal line, and the second power signal line P2 is a cathode power signal line.

At least one pixel circuit 10 further includes a photodiode PD. A first electrode of the photodiode PD is coupled to the second electrode of the data writing transistor T1. In this case, the first electrode of the photodiode PD is coupled to the second node N2, and a second electrode of the photodiode PD is coupled to the first voltage signal line V1. In an embodiment of the present disclosure, the photodiode PD is coupled to the data line Data through the data writing transistor T1. In some embodiments, the first electrode of the photodiode PD is a cathode, and the second electrode of the photodiode PD is an anode. In other embodiments, the first electrode of the photodiode PD is an anode, and the second electrode of the photodiode PD is a cathode. In the following embodiments, an example where the first electrode of the photodiode PD being a cathode and the second electrode being an anode is taken for description.

An operation cycle of the pixel circuit 10 includes a reset phase t1, a data writing phase t2, and a light-emitting phase t3. The operation cycle of the pixel circuit 10 is described with reference to the sequence diagram shown in FIG. 2.

During the reset phase t1, the second scanning signal line S2 provides an enable signal to control the node reset transistor T3 to turn on and write a reset signal provided by the reset signal line Ref into the first node N1, so as to reset the first node N1, that is, to reset the control electrode of the drive transistor Tm.

During the data writing phase t2, the first scanning signal line S1 provides an enable signal to control the data writing transistor T1, the threshold compensation transistor T2, and the electrode reset transistor T4 to turn on. After being turned on, the electrode reset transistor T4 writes the reset signal provided by the reset signal line Ref into the fourth node N4, to reset the fourth node N4, that is, to reset the first electrode of the light-emitting device 20.

When no light is incident on the photodiode PD, after the data writing transistor T1 is turned on, the cathode of the photodiode PD is connected to the data line Data, and a voltage value of a voltage signal provided by the first voltage signal line V1 is controlled to be lower than a voltage value of a data signal provided by the data line Data. Although the photodiode PD works under a reverse voltage, a dark current generated by the photodiode PD is extremely low because there is no light, and the impact of the dark current on the voltage of the data line Data is also small. In the data writing phase t2, after the data writing transistor T1 and the threshold compensation transistor T2 are turned on, the data signal provided by the data line Data is written into the first node N1, and a threshold voltage of the drive transistor Tm is self-checked and compensated, to complete the data writing process.

When light is incident on the photodiode PD, the irradiation causes a large increase in the carrier concentration in the anode region and the cathode region of the photodiode PD; the photodiode PD operates under a reverse voltage, and the reverse saturated leakage current increases, forming a photocurrent. Because the cathode of the photodiode PD is connected to the data line Data, the photocurrent generated by the photodiode PD will cause the voltage on the data line Data to change. The position of the optical touch can be determined by detecting the voltage change on the data line Data, thereby realizing the optical touch detection. Because the cathode of the photodiode PD is coupled to the second node N2, the photocurrent will cause a potential of the second node N2 to change. In the data writing phase t2, the threshold compensation transistor T2 will also be turned under the control of the enable signal, and will also complete the data writing process, except that the data signal actually written into the first node N1 in this case is greatly different from an expected data signal (that is, an expected value of the data signal).

It can be understood that, the irradiation referred to in the description of the operating process of the data writing phase t2 refers to laser light irradiation in the application. It can be understood that, in use of the display panel, there can be ambient light incident on the photodiode PD. However, due to a relatively low intensity, the ambient light cannot cause the photodiode PD in a reverse bias state to generate a photocurrent that can be used for optical touch detection.

During the light-emitting phase t3, the light-emitting control line E provides an enable signal to control the first light-emitting control transistor T5 and the second light-emitting control transistor T6 to turn on; after being turned on under the voltage control of the first node N1, the drive transistor Tm generates a driving current, and provides the driving current to the light-emitting device 20 to control the light-emitting device 20 to emit light.

When no light is incident on the photodiode PD, the data signal written into the first node N1 in the data writing phase t2 is the expected data signal; therefore, in the light-emitting phase t3, light-emitting brightness of the light-emitting device 20 is the expected brightness.

When there is light incident on the photodiode PD, because the data signal written into the first node N1 in the data writing phase t2 is greatly different from the expected data signal, the brightness of the light-emitting device 20 in the light-emitting phase t3 is greatly (i.e., appreciably) different from the expected brightness.

In other words, when there is light incident on the photodiode PD, the data line Data and the cathode of the photodiode PD can be connected to each other by using an enable state of the data writing transistor T1, to set the photodiode PD to a reverse bias state, thereby detecting a voltage change on the data line Data. The position of the optical touch signal is determined based on the voltage change on the data line Data, thereby implementing optical touch detection. When the photodiode PD generates a photocurrent, a normal data signal (that is, the expected data signal) cannot be written into the pixel circuit 10 where the photodiode PD is located, which finally results in abnormal brightness of the light-emitting device 10 coupled to the pixel circuit 20. The optical touch function is realized using interaction between the laser pointer and the display panel in actual application. After laser light emitted by the laser pointer is incident on the display panel, a bright spot will be formed on the display panel. That is, even if the brightness of the light-emitting device is abnormal at the position irradiated by the laser pointer, the overall visual effect will not be affected.

In the display panel provided by the embodiments of the present disclosure, the photodiode PD is integrated in the pixel circuit 10, and the photodiode PD is coupled to the data line Data through the data writing transistor T1. When the photodiode PD does not receive light, the pixel circuit 10 sequentially executes the reset phase t1, the data writing phase t2, and the light-emitting phase t3, to drive the light-emitting device 20 to emit light to reach the expected brightness. When the photodiode PD receives light, the pixel circuit 10 executes the data writing phase t2, and the photodiode PD works under a reverse voltage to generate a photocurrent, which will cause the voltage on the data line Data to change. The position of an optical touch can be detected by detecting a voltage change on the data line, to realize pixel-level positioning for the optical touch signal, thereby improving the accuracy of touch detection and improving the user experience. During an optical touch operation, a laser pointer does not need to be in contact with the display panel, which avoids wear and tear of the display panel. In the embodiments of the present disclosure, by integrating the photodiode PD in the pixel circuit 10, it is unnecessary to additionally arrange a touch detection circuit in the display panel, which can simplify the wiring in the display panel and increase the degree of integration.

In some embodiments, the display panel further includes a touch determining module. The touch determining module is coupled to the data line Data, and is configured to detect a voltage value on the data line Data when the data writing transistor T1 is turned on, and to determine a position of an optical touch signal according to a voltage value. In the embodiments of the present disclosure, the optical touch signal can be acquired in the data writing phase t2, and then the touch determining module processes the optical touch signal. The acquisition process of the optical touch signal does not affect the working sequence of the pixel circuit 10.

The touch determining module can be integrated in a display driver chip. After determining the optical touch position according to the optical touch signal, the touch determining module can feedback optical touch position information to a main board of the electronic device through the display driver chip. The main board controls the display panel according to the optical touch position information, thereby implementing a human-computer interaction process of the optical touch function.

In the application, the optical touch operation on the display panel can be implemented using the laser pointer. Light emitted by the laser pointer is incident on a partial region of the display panel. The photodiode PD of the pixel circuit 10 in the partial region receives the light. When the pixel circuit 10 operates in the data writing phase t2, the photodiode PD receiving the light works under a reverse voltage to generate a photocurrent. The photocurrent affects the voltage on the data line Data. The position of the optical touch is detected by detecting the change of the voltage signal on the data line Data. Then, the optical touch is fed back according to the position of the optical touch, to control an operating state of the display panel.

In some application scenarios, the laser pointer can have some functions of a mouse. For example, if there is a cursor on a display screen, the left button of the mouse is clicked to move the cursor in the related art. With the display panel provided by the embodiments of the present disclosure, the laser pointer can be used to move the cursor, and the position irradiated by the laser pointer is the optical touch position. After the optical touch position is detected, the system moves the cursor to the optical touch position.

In some application scenarios, such as presentations, it is necessary to mark parts of the text by, for example, underlining or circling them. With the display panel provided by the embodiments of the present disclosure, the text can be marked using the irradiation of the laser pointer. The position irradiated by the laser pointer is the optical touch position. When multiple optical touch positions are detected, the brightness of the light-emitting device at the optical touch positions is controlled to form an underline marker or a circle marker during display.

The pixel circuit 10 in FIG. 1 is merely shown schematically. The pixel circuit in the embodiments of the present disclosure can be any pixel circuit including a data writing transistor in the related art. Transistors of the pixel circuit 10 shown in FIG. 1 are p-type transistors. In other embodiments, transistors of the pixel circuit 10 are n-type transistors. In other embodiments, the pixel circuit 10 includes n-type transistors and p-type transistors.

FIG. 1 schematically illustrates that the control terminal of the electrode reset transistor T4 and the control terminal of the data writing transistor T1 are coupled to a same scanning signal line. In other embodiments, the control terminal of the electrode reset transistor T4 and the control terminal of the node reset transistor T3 are coupled to a same scanning signal line. In this case, the process of resetting the control electrode of the drive transistor Tm and the process of resetting the first electrode of the light-emitting device 20 are performed at the same time.

FIG. 1 schematically illustrates that the first electrode of the electrode reset transistor T4 and the first electrode of the node reset transistor T3 are coupled to a same reset signal line Ref. In other embodiments, the first electrode of the electrode reset transistor T4 and the first electrode of the node reset transistor T3 are coupled to different reset signal lines. That is, the reset voltage for resetting the control electrode of the drive transistor Tm and the reset voltage for resetting the first electrode of the light-emitting device 20 have different values.

Figure 3:
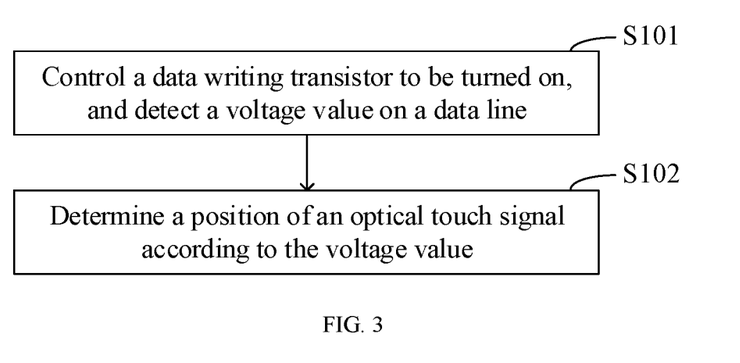
FIG. 3 is a flowchart of a method for driving a display panel according to an embodiment of the present disclosure.

Based on a same concept, some embodiments of the present disclosure further provide a method for driving a display panel, to drive the display panel provided by the embodiments of the present disclosure. The method provided by the embodiments of the present disclosure can be referred to the embodiment shown in FIG. 1. FIG. 3 is a flowchart of a method for driving a display panel according to an embodiment of the present disclosure. As shown in FIG. 3, the method includes step S101 and step S102.

At step S101, a data writing transistor T1 is controlled to be turned on, and a voltage value on a data line Data is detected. At step S102, a position of an optical touch signal is determined according to the voltage value.

When the method provided by the embodiments of the present disclosure is used for driving the display panel, after the data writing transistor T1 is controlled to be turned on, a cathode of a photodiode PD can be connected to the data line Data, to apply a voltage on the data line Data to the cathode of the photodiode PD. An anode of the photodiode PD is coupled to a first voltage signal line V1, and the first voltage signal line V1 provides a transmitted voltage signal to the anode of the photodiode PD. Therefore, after the data writing transistor T1 is controlled to be turned on, the photodiode PD in the pixel circuit 10 can be reversely biased.

When receiving light and being reversely biased, the photodiode PD can generate a photocurrent. The photocurrent generated by the photodiode PD will affect the voltage on the data line Data coupled thereto. In this case, by detecting the voltage value on the data line Data, it can be determined whether a photocurrent is generated by the photodiode PD. The position where the optical touch signal is generated can be determined according to the position of the pixel circuit 10 to which the photodiode PD belongs in the display panel. In the embodiments of the present disclosure, the optical touch position is determined according to the position of the pixel circuit 10, thereby achieving pixel-level positioning detection for the optical touch.

Figure 4:
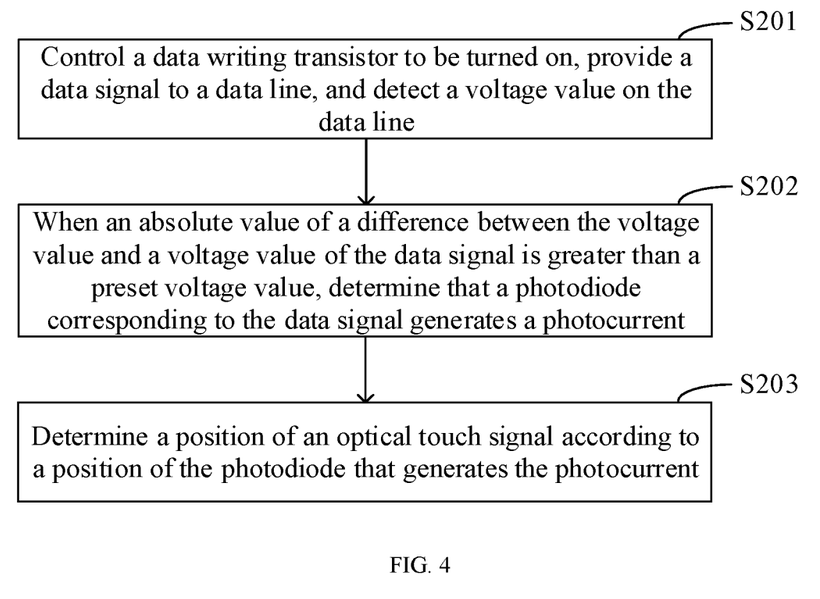
FIG. 4 is a flowchart of a method for driving a display panel according to an embodiment of the present disclosure.

FIG. 4 is a flowchart of a method for driving a display panel according to an embodiment of the present disclosure. In some embodiments, as shown in FIG. 4, the method includes the following steps: step S201, step S202, and step S203.

At step S201, a data writing transistor T1 is controlled to be turned on and to provide a data signal to a data line Data, and a voltage value on the data line Data is detected.

At step S202, when an absolute value of a difference between the voltage value and a voltage value of the data signal is greater than a preset voltage value, it is determined that a photodiode PD corresponding to the data signal generates a photocurrent.

At step S203, a position of an optical touch signal is determined according to a position of the photodiode PD that generates the photocurrent.

In a reverse bias state of the photodiode PD, when ambient light is incident on the photodiode PD, although the ambient light is much weaker than light emitted by the laser pointer, the ambient light also affects the photodiode PD in certain degree to cause the photodiode PD to generate a small leakage current. It can be understood that the small leakage current will also affect the voltage on the data line Data. In the methods of the present disclosure, a preset voltage value is set, and when a voltage variation on the data line Data is greater than the preset voltage value, it is determined that there is an optical touch signal. In other words, it is determined that the voltage variation on the data line Data is caused by an optical touch operation only when the voltage variation reaches a certain value, which can improve the accuracy of optical touch detection.

In some embodiments, the method includes: controlling an operation cycle of the pixel circuit 10 to include a data writing phase t2. Reference can be made to the description about the operation cycle of the pixel circuit 10 in the embodiment shown in FIG. 2. In the data writing phase t2, the data writing transistor T1 is controlled to turn on, and the voltage value on the data line Data is detected. In the embodiment, an acquisition process of the optical touch signal is integrated in the operation cycle of the pixel circuit 10, and does not affect the operating sequence of the pixel circuit 10.

In some embodiments, as shown in FIG. 1, the anode of the photodiode PD is directly connected to the first voltage signal line V1. In this case, the voltage signal provided by the first voltage signal line V1 can be directly transmitted to the anode of the photodiode PD. Generally, the light-emitting device can display brightness of different grayscales, and each grayscale corresponds to one data voltage. Therefore, multiple different grayscales correspond to one data voltage range, and the data voltage range includes a minimum data voltage and a maximum data voltage.

A voltage value of the voltage signal provided by the first voltage signal line V1 is designed to be smaller than a voltage value of the minimum data voltage. In this case, when the pixel circuit 10 operates in the data writing phase and the data writing transistor T1 is turned on, the data signal is written into the cathode of the photodiode PD, so that the photodiode PD is reversely biased. When the photodiode PD does not receive light, the photodiode PD generates a small dark current, and the dark current has small impact on the voltage of the data line Data. The pixel circuit 10 can execute the normal data writing process to write the data signal provided by the data line Data into the first node N1, and can control the light-emitting device 20 to emit light normally in the subsequent light-emitting phase. When the photodiode PD receives light, the photocurrent generated by the photodiode PD causes the voltage on the data line Data to change. Upon detection that a voltage variation on the data line Data is greater than the preset voltage value, it is determined that there is an optical touch signal at the position of the pixel circuit 10, thereby determining the position of the optical touch signal and also determining the position of the optical touch. By integrating the photodiode PD of the pixel circuit 10, pixel-level detection for the optical touch signal is achieved.

Figure 5:
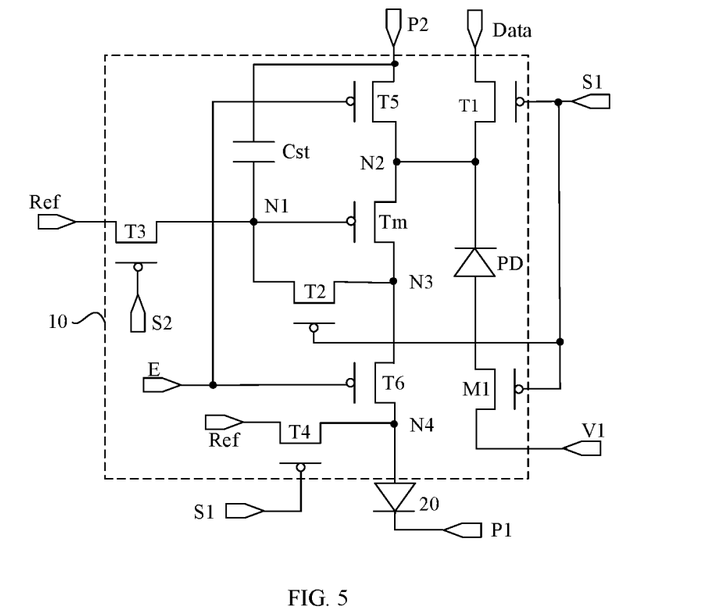
FIG. 5 is a schematic circuit diagram of another display panel according to an embodiment of the present disclosure.

In some embodiments, the photodiode PD is coupled to the first voltage signal line V1 through a transistor. FIG. 5 is a schematic circuit diagram of another display panel according to an embodiment of the present disclosure. As shown in FIG. 5, the pixel circuit 10 further includes a first transistor M1, and the photodiode PD is coupled to the first voltage signal line V1 through the first transistor M1. FIG. 5 schematically shows that a control electrode of the first transistor M1 is coupled to the first scanning signal line S1, that is, the control electrode of the first transistor M1 and the control electrode of the data writing transistor T1 are coupled to the same scanning signal line. When the first scanning signal line S1 provides an enable signal, the first transistor M1 and the data writing transistor T1 can be controlled to turn on at the same time. After the first transistor M1 is turned on, the signal provided by the first voltage signal line V1 is written into the anode of the photodiode PD. After the data writing transistor T1 is turned on, the data signal provided by the data line Data is written into the cathode of the photodiode PD, and the photodiode PD is reversely biased. When no light is incident on the photodiode PD, the photodiode PD only generates a small dark current under a reverse voltage, and the dark current has a small impact on the voltage of the data line Data. The pixel circuit 10 sequentially executes the data writing phase t2 and the light-emitting phase t3, and controls the light-emitting device 20 to emit light based on expected brightness in the light-emitting phase t3. When there is light incident on the photodiode PD, the photodiode PD works under a reverse voltage to generate a photocurrent. The photocurrent causes the voltage on the data line Data to change. The position of the optical touch can be detected by detecting the change of the voltage signal on the data line Data, thereby implementing pixel-level positioning for the optical touch signal and improving the accuracy of optical touch detection. When the photocurrent causes the voltage on the data line Data to change, the pixel circuit 10 can still sequentially execute the data writing phase t2 and the light-emitting phase t3, except that the data signal written into the first node N1 in the data writing phase t2 is greatly different from the expected data signal, making the brightness of the light-emitting device in the light-emitting phase t3 greatly different from the expected brightness. In addition, when the laser pointer is used to irradiate the display panel in the application, a bright spot will be formed on the display panel. Therefore, even if the brightness of the light-emitting device at the position irradiated by the laser pointer is greatly different from the expected brightness, the overall display effect will not be affected.

In some implementations, in the operation cycle of the pixel circuit 10, a period during which the control electrode of the first transistor M1 receives the enable signal is not later than a period during which the control electrode of the data writing transistor T1 receives the enable signal. In some embodiments of the present disclosure, the photodiode PD and the data line Data are electrically connected when the data writing transistor T1 is turned on, so that the data line Data is used to detect whether the photodiode PD generates a photocurrent. In this case, it can be ensured that the photodiode PD can operate under a reverse voltage in the data writing transistor T1. FIG. 5 schematically shows that the control electrode of the first transistor M1 is coupled to the first scanning signal line S1. In the embodiment shown in FIG. 5, the control electrode of the first transistor M1 and the control electrode of the data writing transistor T1 receive the enable signal during the same period, so that the photodiode PD is reversely biased when the data writing transistor T1 is turned on. In another embodiment, the control electrode of the first transistor M1 is coupled to the second scanning signal line S2. It can be seen from the sequence diagram in FIG. 2 that, in the operation cycle of the pixel circuit 10, a period during which the second scanning signal line S2 provides the enable signal is earlier than a period during which the first scanning signal line S1 provides the enable signal. Therefore, a period during which the control electrode of the first transistor M1 receives the enable signal is earlier than a period during which the control electrode of the data writing transistor T1 receives the enable signal. In this implementation, a voltage signal is first applied to the anode of the photodiode PD, and then the photodiode PD is reversely biased after the data writing transistor T1 is turned on.

Figure 6:
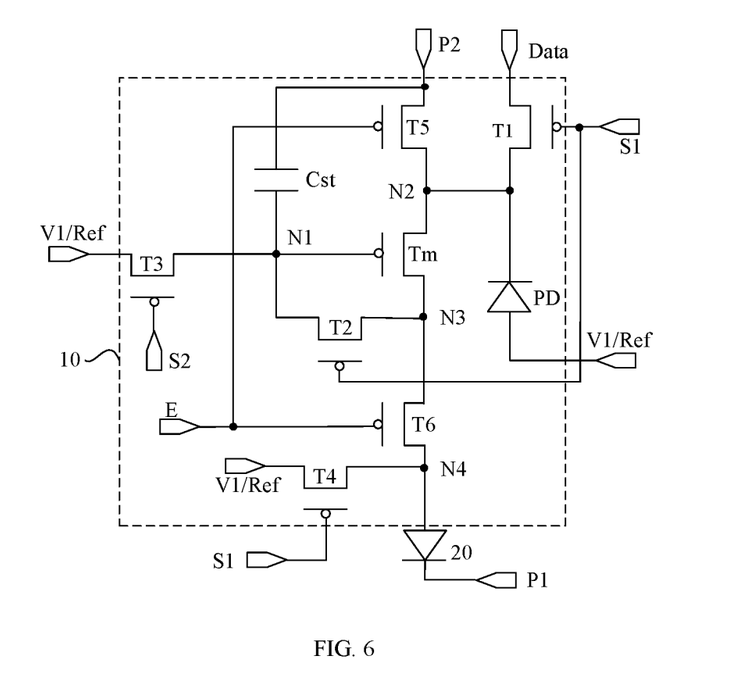
FIG. 6 is a schematic circuit diagram of another display panel according to an embodiment of the present disclosure.

FIG. 6 is a schematic circuit diagram of another display panel according to an embodiment of the present disclosure. In some embodiments, as shown in FIG. 6, the first voltage signal line V1 is reused as a reset signal line Ref, and the first voltage signal line V1 is configured to provide a reset signal to the pixel circuit 10. The first electrode of the node reset transistor T3 and the first electrode of the electrode reset transistor T4 are both coupled to the first voltage signal line V1. In an embodiment, the first voltage signal line V1 provides a voltage signal to the second electrode of the photodiode PD; at the same time, the first voltage signal line V1 also provides a reset signal to the pixel circuit 10. By reusing the first voltage signal line V1, the number of signal lines in the display panel can be reduced, thereby saving the wiring space in the display panel.

FIG. 6 schematically shows that the node reset transistor T3 and the electrode reset transistor T4 are coupled to the same reset signal line. In some implementations, the display panel includes a first reset signal line and a second reset signal line, where the first reset signal line and the second reset signal line provide voltage signals having different voltage values. The first electrode of the node reset transistor T3 is coupled to the first reset signal line, and the first electrode of the electrode reset transistor T4 is coupled to the second reset signal line. In an embodiment, the first voltage signal line V1 is reused as the first reset signal line. In this case, the first electrode of the node reset transistor T3 and the anode of the photodiode PD are both coupled to the first voltage signal line V1. In another embodiment, the first voltage signal line V1 is reused as the second reset signal line. In this case, the first electrode of the electrode reset transistor T4 and the anode of the photodiode PD are both coupled to the first voltage signal line V1.

Figure 7:
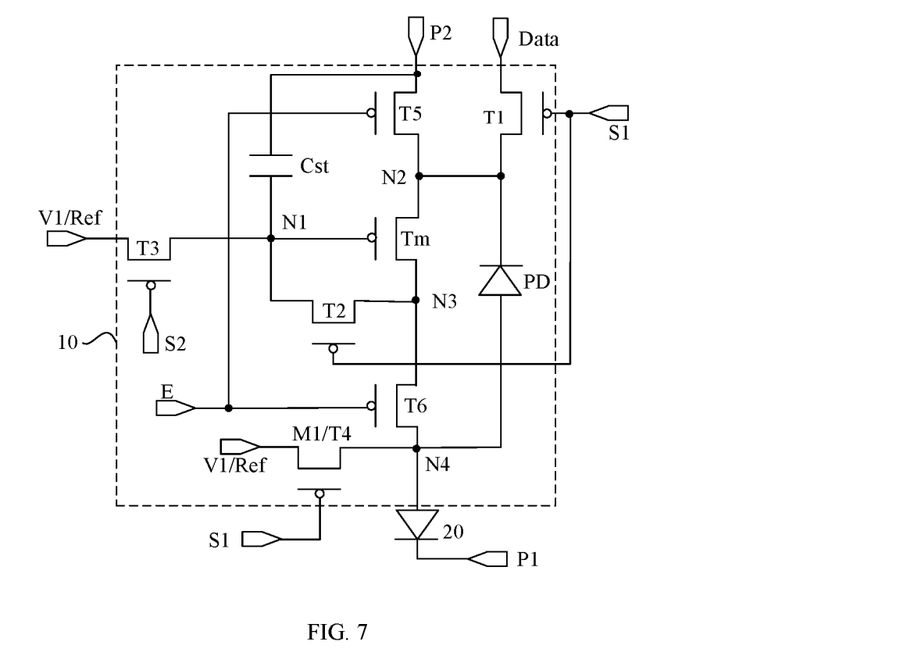
FIG. 7 is a schematic circuit diagram of another display panel according to an embodiment of the present disclosure.

FIG. 7 is a schematic circuit diagram of another display panel according to an embodiment of the present disclosure. In some embodiments, as shown in FIG. 7, the first transistor M1 is reused as the electrode reset transistor T4, the first electrode of the first transistor M1 is coupled to the first voltage signal line V1, and the second electrode of the first transistor M1 is coupled to the light-emitting device 20 and the second electrode of the photodiode PD. That is, the second electrode of the photodiode PD is coupled to the first voltage signal line V1 through the electrode reset transistor T4, and the first voltage signal line V1 is reused as the reset signal line Ref. In this embodiment, when the electrode reset transistor T4 is turned on, the second electrode of the photodiode PD is connected to the reset signal line Ref; when the data writing transistor T1 is turned on, the first electrode of the photodiode PD is connected to the data line Data, so that the photodiode PD is reversely biased. Moreover, at the moment when the first electrode of the photodiode PD is connected to the data line Data, it is detected whether the voltage on the data line Data changes. Upon detection that the voltage on the data line Data changes, it can be determined that the photodiode PD has generated a photocurrent, that is, the presence of an optical touch signal can be determined. The optical touch position in the display panel can be determined according to the pixel circuit 10 in which the photodiode PD is located, thereby realizing pixel-level positioning for the optical touch signal.

As shown in FIG. 7, the control electrode of the first transistor M1 and the control electrode of the data writing transistor T1 are both coupled to the first scanning signal line S1, that is, the control electrodes of the two transistors are coupled to the same scanning signal line. When the first scanning signal line S1 provides an enable signal, the first transistor M1 and the data writing transistor T1 are controlled to turn on at the same time. The first electrode of the photodiode PD is connected to the data line Data. At the same time, the second electrode of the photodiode PD is connected to the reset signal line Ref, so that the photodiode PD is reversely biased in this phase. When the photodiode PD receives light, the photodiode PD will generate a photocurrent under the effect of a reverse voltage, thus affecting the voltage on the data line Data. The pixel-level positioning detection for the optical touch signal is implemented by detecting the voltage change on the data line Data.

Figure 8:
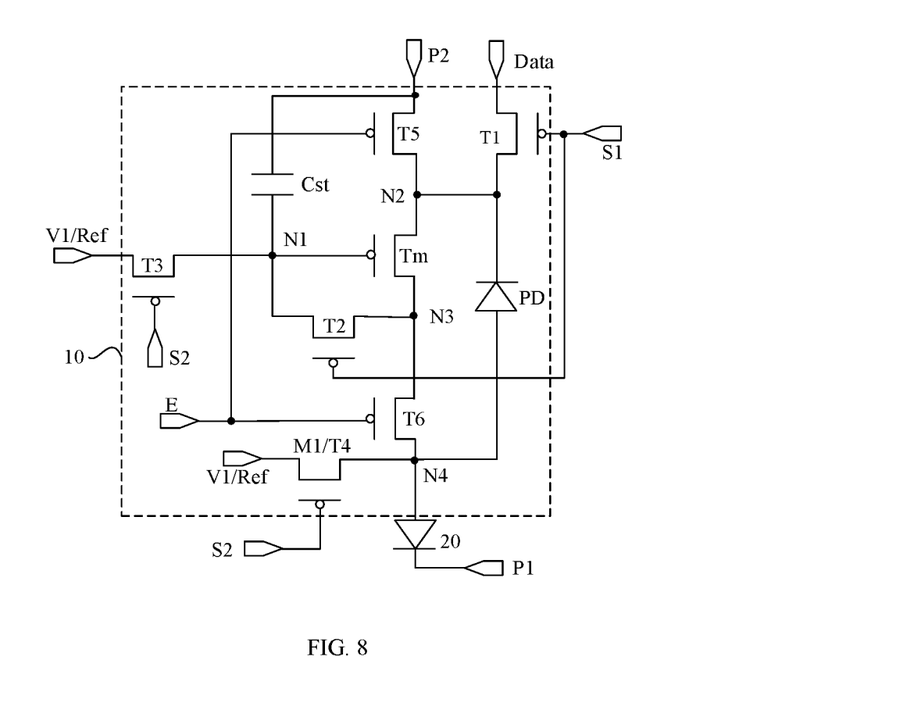
FIG. 8 is a schematic circuit diagram of another display panel according to an embodiment of the present disclosure.

FIG. 8 is a schematic circuit diagram of another display panel according to an embodiment of the present disclosure. In some embodiments, as shown in FIG. 8, the control electrode of the first transistor M1 and the control electrode of the node reset transistor T3 are both coupled to the second scanning signal line S2, that is, the control electrodes of the two transistors are coupled to the same scanning signal line. When the pixel circuit 10 operates in the reset phase t1, the second scanning signal line S2 provides an enable signal to control the first transistor M1 and the node reset transistor T3 to be turned on. After the node reset transistor T3 is turned on, the reset signal provided by the first voltage signal line V1 (that is, the reset signal line Ref) is written into the first node N1, to reset the first node N1. After the first transistor M1 is turned on, the reset signal provided by the first voltage signal line V1 is written into the fourth node N4 to reset the fourth node N4, and the second electrode of the photodiode PD is coupled to the fourth node N4. In this case, it is equivalent to writing the voltage signal into the second electrode of the photodiode PD. When the pixel circuit 10 works in the data writing phase t2, the first scanning signal line S1 provides an enable signal to control the data writing transistor T1 to turn on. After the data writing transistor T1 is turned on, the first electrode of the photodiode PD is connected to the data line Data, so that the photodiode PD is reversely biased. In this implementation, the voltage signal is first written into the second electrode of the photodiode PD, to wait for the first electrode of the photodiode PD to be connected to the data line Data. When the first electrode of the photodiode PD is connected to the data line Data, the photodiode PD is reversely biased.

Figure 9:
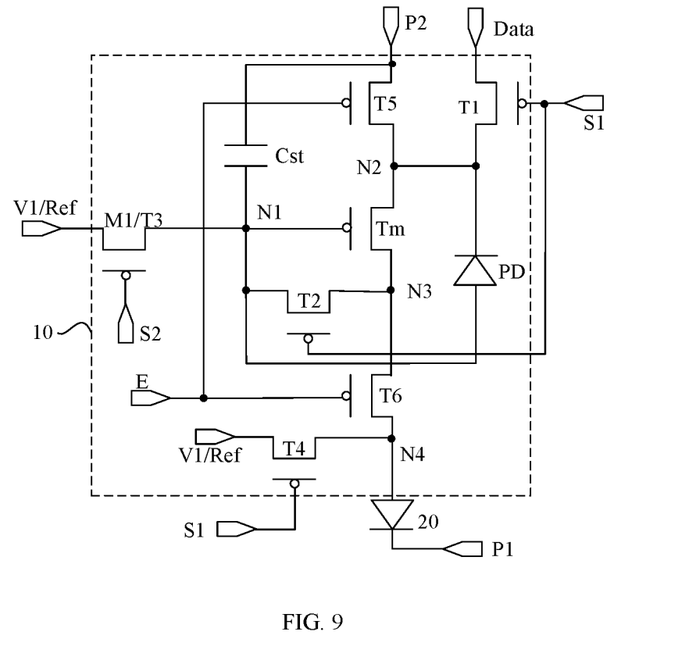
FIG. 9 is a schematic circuit diagram of another display panel according to an embodiment of the present disclosure.

FIG. 9 is a schematic circuit diagram of another display panel according to an embodiment of the present disclosure. In some embodiments, as shown in FIG. 9, the first transistor M1 is reused as the node reset transistor T3. The first electrode of the first transistor M1 is coupled to the first voltage signal line V1, the second electrode of the first transistor M1 is coupled to the first node N1, and the control electrode of the drive transistor Tm and the second electrode of the photodiode PD are both coupled to the first node N1. The first voltage signal line V1 is reused as the reset signal line Ref. In this implementation, when the pixel circuit 10 works in the reset phase t1, the second scanning signal line S2 provides an enable signal to control the first transistor M1 to turn on. After the first transistor M1 is turned on, a reset signal provided by the first voltage signal line V1 is written into the first node N1, to reset the first node N1. At the same time, after the first transistor M1 is turned on, the first voltage signal line V1 is connected to the second electrode of the photodiode PD. In this case, it is equivalent to writing the voltage signal into the second electrode of the photodiode PD. When the pixel circuit 10 operates in the data writing phase t2, the first scanning signal line S1 provides an enable signal to control the data writing transistor T1 to be turned on. After the data writing transistor T1 is turned on, the first electrode of the photodiode PD is connected to the data line Data, so that the photodiode PD is reversely biased. In this implementation, the voltage signal is first written to the second electrode of the photodiode PD, to wait for the first electrode of the photodiode PD to be connected to the data line Data. When the first electrode of the photodiode PD is connected to the data line Data, the photodiode PD is reversely biased.

Figure 10:
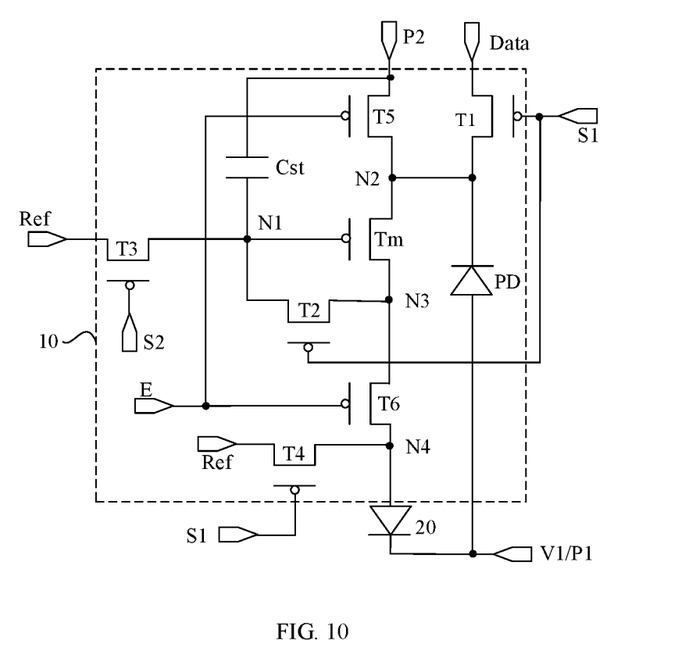
FIG. 10 is a schematic circuit diagram of another display panel according to an embodiment of the present disclosure.

FIG. 10 is a schematic circuit diagram of another display panel according to an embodiment of the present disclosure. In other embodiments, as shown in FIG. 10, the second electrode of the photodiode PD is coupled to the first voltage signal line V1, and the first voltage signal line V1 is reused as the first power signal line P1. The light-emitting device 20 includes a first electrode, a light-emitting layer, and a second electrode. The first electrode is coupled to the pixel circuit 10, that is, the first electrode is coupled to the fourth node N4. The second electrode is coupled to the first voltage signal line V1. In this implementation, the first voltage signal line V1 is reused, which can simplify the wiring manner in the display panel. The second electrode of the photodiode PD is constantly connected to the first voltage signal line V1. In this case, during detection of the optical touch, it is necessary to wait for the data writing transistor T1 to be turned on to connect the first electrode of the photodiode PD to the data line Data, so that the photodiode PD is reversely biased.

Figure 11:
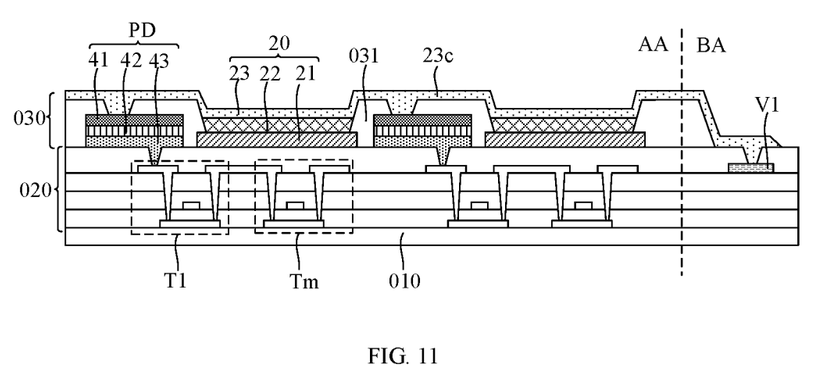
FIG. 11 is a sectional view of another display panel according to an embodiment of the present disclosure.

FIG. 11 is a sectional view of another display panel according to an embodiment of the present disclosure. In some embodiments, as shown in FIG. 11, the display panel includes a substrate 010, a transistor layer 020 located at a side of the substrate, and a light-emitting device layer 030. Transistors of the pixel circuit 10 are located in the transistor layer 020, and the light-emitting device 20 is located in the light-emitting device layer 030. The light-emitting device 20 includes a first electrode 21, a light-emitting layer 22, and a second electrode 23 that are stacked together. Second electrodes 23 of multiple light-emitting devices 20 are interconnected to form a second electrode layer 23c. The second electrode of the photodiode PD is coupled to the first voltage signal line V1 through the second electrode layer 23c. In this implementation, the first voltage signal line V1 is a voltage signal provided by the second electrode layer 23c. The display panel includes a display region AA and a non-display region BA, where the first voltage signal line V1 is located in the non-display region BA. The second electrode layer 23c extends from the display region AA to the non-display region BA, and is electrically connected to the first voltage signal line V1 in the non-display region. FIG. 11 schematically shows a film position of the first voltage signal line V1 in the display panel, which is not intended to limit the present disclosure.

FIG. 11 further schematically shows the data writing transistor T1 and the drive transistor Tm in the pixel circuit 10. The photodiode PD is coupled to the data writing transistor T1.

As shown in FIG. 11, the photodiode PD includes a p-type semiconductor layer 41, an intrinsic layer 42, and an n-type semiconductor layer 43 that are stacked together. That is, the photodiode PD includes a PIN junction, and the intrinsic layer 42 has a low doping and a high resistance. In other embodiments, the photodiode PD includes a PN junction, that is, the photodiode PD includes a p-type semiconductor layer and an n-type semiconductor layer that are stacked together.

In the embodiment shown in FIG. 11, the n-type semiconductor layer 43 is the first electrode of the photodiode PD, and the p-type semiconductor layer 41 is the second electrode of the photodiode PD.

In some embodiments, as shown in FIG. 11, both the photodiode PD and the light-emitting device 20 are located at a side of the transistor layer 020 facing away from the substrate 010, and the photodiode PD is located between adjacent light-emitting devices 20. In this implementation, the arrangement of the photodiode PD does not increase the thickness of the display panel. The light-emitting device layer 030 further includes a pixel defining layer 031, and the pixel defining layer 031 is used for separating adjacent light-emitting devices 20. The photodiode PD can be connected to the second electrode layer 23c through a via in the pixel defining layer 031, so that the second electrode of the photodiode PD is coupled to the first voltage signal line V1 through the second electrode layer 23c. The photodiode PD is arranged between two light-emitting devices 20. Laser light emitted by the laser pointer can reach the photodiode PD through few films, thereby reducing the optical loss of the laser light, which improves the accuracy of the optical touch detection.

Figure 12:
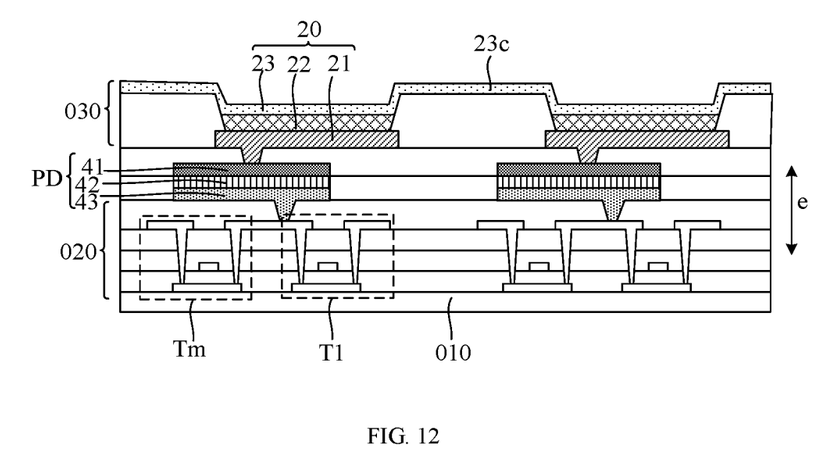
FIG. 12 is a sectional view of another display panel according to an embodiment of the present disclosure.

FIG. 12 is a sectional view of another display panel according to an embodiment of the present disclosure. In some embodiments, as shown in FIG. 12, in a direction e perpendicular to a pane of the substrate 010, the photodiode PD is located between the transistor layer 020 and the light-emitting device 20. FIG. 12 schematically shows that the second electrode of the photodiode PD is electrically connected to the first electrode 21 of the light-emitting device 20. Based on the circuit diagram shown in FIG. 7, the first electrode 21 of the light-emitting device 20 is also coupled to the fourth node N4, so that the first electrode 21 is coupled to the second electrode of the electrode reset transistor T4 and the second electrode of the second light-emitting control transistor T6. FIG. 12 merely schematically shows the film position of the photodiode PD in the display panel, while other details are simplified. Therefore, FIG. 12 does not show a via through which the first electrode 21 of the light-emitting device 20 is connected to the fourth node N4. The photodiode PD is manufactured between the transistor layer 020 and the light-emitting device 20, without changing the arrangement manner of original transistors in the pixel circuit 10, thereby simplifying the manufacturing process of the transistor layer 020. The second electrode of the photodiode PD is electrically connected to the first electrode 21 of the light-emitting device. In this case, the second electrode of the photodiode PD is coupled to the electrode reset transistor T4 through the first electrode 21, so as to be coupled to the first voltage signal line V1 through the electrode reset transistor T4. In this way, the wiring in the transistor layer 020 can be simplified.

Figure 13:
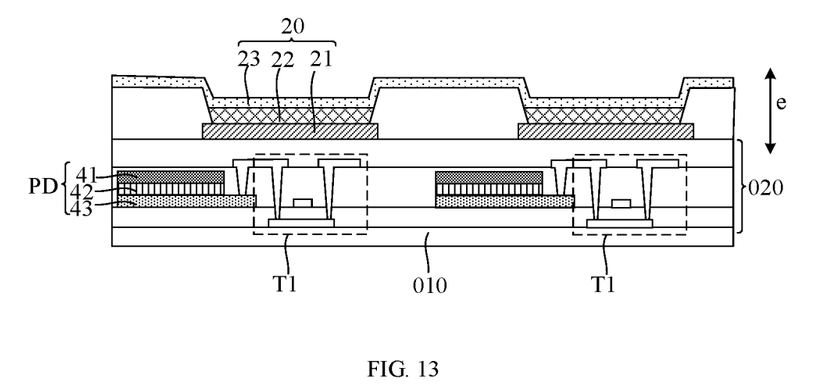
FIG. 13 is a sectional view of another display panel according to an embodiment of the present disclosure.

FIG. 13 is a sectional view of another display panel according to an embodiment of the present disclosure. In some embodiments, as shown in FIG. 13, the photodiode PD is located in the transistor layer 020. The second electrode of the photodiode PD is coupled to the second electrode of the data writing transistor T1. In this implementation, the photodiode PD is integrated in the pixel circuit 10, to implement pixel-level detection for the optical touch position. The photodiode PD is located in the transistor layer 020, so that the arrangement of the photodiode PD does not increase the thickness of the display panel.

In some embodiments, as shown in FIG. 12, in the direction e perpendicular to the plane of the substrate 010, at least a part of the photodiode PD does not overlap with the light-emitting device 20. In the operation cycle of the pixel circuit 10, the photodiode PD is reversely biased and generates a photocurrent only when light is received. The photocurrent will affect the voltage on the data line Data. Therefore, the detection of the optical touch position is implemented by detecting the voltage change on the data line Data. At least a part of the photodiode PD does not overlap with the light-emitting device 20, so that more light at the position irradiated by the laser pointer can be received by the photodiode PD, thereby improving the sensitivity of the photodiode PD and improving the accuracy of the optical touch detection.

Figure 14:
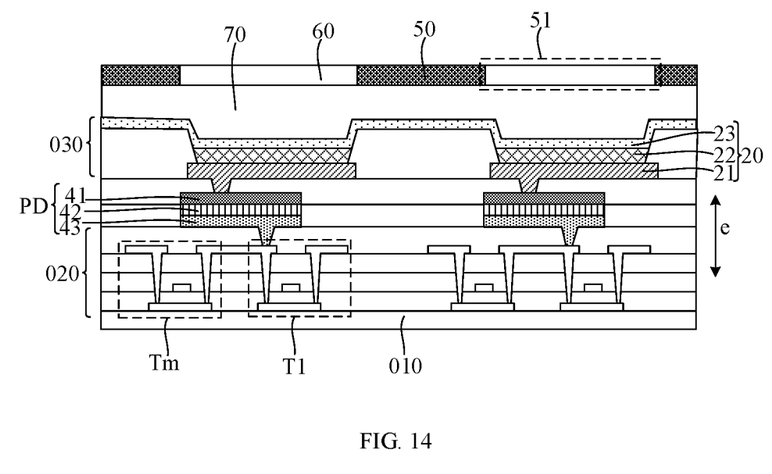
FIG. 14 is a sectional view of another display panel according to an embodiment of the present disclosure.

FIG. 14 is a sectional view of another display panel according to an embodiment of the present disclosure. In some embodiments, as shown in FIG. 14, the display panel further includes a black matrix 50 located at a side of the light-emitting device 20 facing away from the substrate 010. The black matrix 50 has multiple openings 51, and one opening 51 corresponds to one light-emitting device 20. In the direction e perpendicular to the plane of the substrate 010, the photodiode PD overlaps with the light-emitting device 20. The display panel further includes a filtering unit 60 and an encapsulation layer 70. The encapsulation layer 70 is located at a side of the light-emitting device 20 that is away from the substrate 010. The encapsulation layer 70 is configured to provide encapsulation protection for the light-emitting device 20, to isolate the light-emitting device 20 from water and oxygen, thus prolonging the service life of the light-emitting device 20. At least a part of the filtering unit 60 is located in the openings 51. The coordination of the filtering unit 60 and the black matrix 50 can reduce ambient light reflected by the display panel and improve the user experience. The black matrix 50 can shield light, and in application, laser light emitted by the laser pointer will also be shielded by the black matrix 50. In the implementation, light emitted by the laser pointer penetrates the light-emitting device 20 to be incident on the photodiode PD. The photodiode PD is designed to overlap with the light-emitting device 20 to ensure that the photodiode PD can receive laser light, thereby achieving the optical touch detection.

In some embodiments, the size of the photodiode PD is not larger than the size of the light-emitting device 20. The size is calculated based on an area of orthographic projection on the substrate 010. The orthographic projection of the photodiode PD on the substrate 010 is a first projection, the orthographic projection of the light-emitting device 20 on the substrate 010 is a second projection, and the area of the first projection is smaller than or equal to the area of the second projection. In the embodiment in which the photodiode PD is located between adjacent light-emitting devices 20, for example, in the embodiment corresponding to FIG. 11, the size of the photodiode PD is not larger than the size of the light-emitting device 20, thereby ensuring the aperture ratio of the display panel. In the embodiment in which the photodiode PD is located at a side of the light-emitting device 20 that is close to the substrate 010, for example, in the embodiment corresponding to FIG. 12 or FIG. 13, the size of the photodiode PD is not larger than the size of the light-emitting device 20, so that the photodiode PD is not excessively large in size to affect the arrangement of other structures in the display panel.

Figure 15:
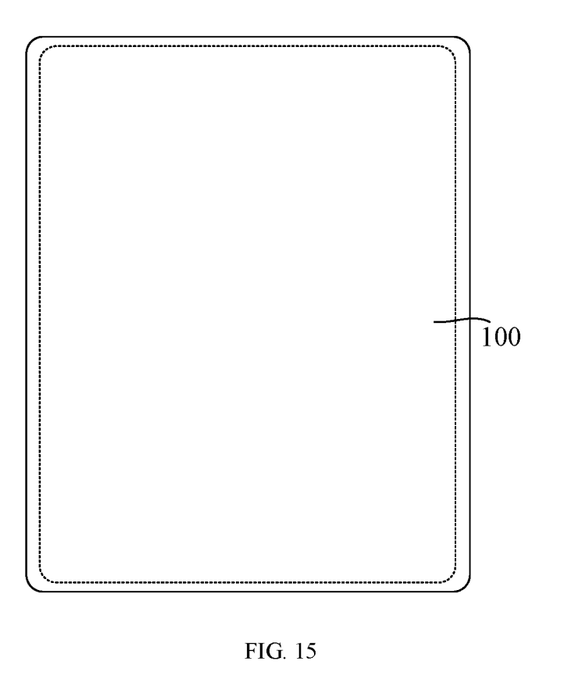
FIG. 15 is a schematic diagram of a display apparatus according to an embodiment of the present disclosure.

Based on the same concept, some embodiments of the present disclosure further provide a display apparatus. FIG. 15 is a schematic diagram of a display apparatus according to an embodiment of the present disclosure. As shown in FIG. 15, the display apparatus includes the display panel 100 provided in any embodiment of the present disclosure. The structure of the display panel 100 has been described in the foregoing embodiments, and details are not repeated herein. The display apparatus provided by the embodiments of the present disclosure can be, for example, any device having a display function, such as a mobile phone, a tablet computer, a notebook computer, an electronic paper book, a television, or an intelligent watch.

The above merely illustrates some embodiments of the present disclosure, and is not intended to limit the present disclosure. Any modifications, equivalent replacements, improvements, and like made within the principle of the present disclosure shall fall within the scope of the present disclosure.

Finally, it should be noted that the foregoing embodiments are merely intended to describe and not to limit the technical solutions of the present disclosure. Although the present disclosure has been described in detail with reference to the foregoing embodiments, persons skilled in the art should understand that they can still make modifications to the technical solutions described in the foregoing embodiments or make equivalent replacements to some or all of the technical features thereof. These modifications or replacements do not make the essence of the corresponding technical solutions deviate from the scope of the technical solutions of the embodiments of the present disclosure.

What is claimed is:

1. A display panel, comprising:
   at least one pixel circuit;
   at least one light-emitting device coupled to the at least one pixel circuit;
   at least one data line; and
   a first voltage signal line,
   wherein one pixel circuit of the at least one pixel circuit comprises a data writing transistor and a photodiode; the data writing transistor comprises a first electrode coupled to one of the at least one data line and a second electrode coupled to a first electrode of the photodiode; and the photodiode further comprises a second electrode coupled to the first voltage signal line, and
   wherein the one pixel circuit further comprises a first transistor, and the photodiode is coupled to the first voltage signal line through the first transistor.

2. The display panel according to claim 1, wherein the second electrode of the photodiode is directly connected to the first voltage signal line.

3. The display panel according to claim 1, wherein in an operation cycle of the one pixel circuit, a period in which a control electrode of the first transistor receives an enable signal is not later than a period in which a control electrode of the data writing transistor receives an enable signal.

4. The display panel according to claim 1, wherein the first voltage signal line is reused as a reset signal line; and the first voltage signal line is configured to provide a reset signal to the pixel circuit.

5. The display panel according to claim 4, wherein the first transistor is reused as an electrode reset transistor; and the first transistor comprises a first electrode coupled to the first voltage signal line, and a second electrode coupled to the light-emitting device and the second electrode of the photodiode.

6. The display panel according to claim 5, further comprising:
at least one scanning signal line, wherein a control electrode of the first transistor and a control electrode of the data writing transistor are coupled to one of the at least one scanning signal line.

7. The display panel according to claim 4, wherein the first transistor is reused as a node reset transistor, and the one pixel circuit further comprises a drive transistor;
the first transistor comprises a first electrode coupled to the first voltage signal line, and a second electrode coupled to a first node; and
a control electrode of the drive transistor and the second electrode of the photodiode are both coupled to the first node.

8. The display panel according to claim 1, wherein the first voltage signal line is reused as a first power signal line; and
one of the at least one light-emitting device comprises a first electrode coupled to the one pixel circuit, a light-emitting layer, and a second electrode coupled to the first voltage signal line.

9. The display panel according to claim 8, wherein the at least one light-emitting device comprises at least two light-emitting devices, wherein second electrodes of the at least two light-emitting devices are connected to each other to form a second electrode layer; and
the second electrode of the photodiode is coupled to the first voltage signal line through the second electrode layer.

10. The display panel according to claim 1, further comprising:
a substrate; and
a transistor layer located at a side of the substrate,
wherein the data writing transistor of the one pixel circuit is located in the transistor layer,
and the at least one light-emitting device is located at a side of the transistor layer facing away from the substrate, and
in a direction perpendicular to a plane of the substrate, the photodiode is located between the transistor layer and one of the at least one light-emitting device.

11. The display panel according to claim 1, further comprising:
a substrate; and
a transistor layer located at a side of the substrate,
wherein the data writing transistor of the one pixel circuit is located in the transistor layer, and the photodiode is located in the transistor layer.

12. The display panel according to claim 1, further comprising:
a substrate; and
a transistor layer located at a side of the substrate,
wherein the data writing transistor of the one pixel circuit is located in the transistor layer, and both the photodiode and the at least one light-emitting device are located at a side of the transistor layer facing away from the substrate; and
the at least one light-emitting device comprises at least two light-emitting devices, and the photodiode is located between adjacent light-emitting devices of the at least two light-emitting devices.

13. The display panel according to claim 1, further comprising:
a substrate, wherein the at least one pixel circuit and the at least one light-emitting device are located at a same side of the substrate; and in a direction perpendicular to a plane of the substrate, the photodiode at least partially overlaps one of the at least one light-emitting device.

14. The display panel according to claim 1, further comprising:
a substrate, wherein the at least one pixel circuit and the at least one light-emitting device are located at a same side of the substrate;
a black matrix located at a side of at least one the light-emitting device facing away from the substrate, wherein the black matrix has a plurality of openings, and each of the plurality of openings corresponds to one of the at least one light-emitting device; and
in a direction perpendicular to a plane of the substrate, the photodiode overlaps one of the at least one light-emitting device.

15. The display panel according to claim 1, further comprising:
a substrate, wherein the at least one pixel circuit and the at least one light-emitting device are located at a same side of the substrate; an orthographic projection of the photodiode on the substrate is a first projection, an orthographic projection of one of the at least one light-emitting device on the substrate is a second projection, and the first projection has an area smaller than or equal to an area of the second projection.

16. A method for driving a display panel, wherein the display panel comprises at least one pixel circuit, at least one light-emitting device coupled to the at least one pixel circuit, at least one data line, and a first voltage signal line; one pixel circuit of the at least one pixel circuit comprises a data writing transistor and a photodiode; the data writing transistor comprises a first electrode coupled to one of the at least one data line and a second electrode coupled to a first electrode of the photodiode; and the photodiode comprises a second electrode coupled to the first voltage signal line, the one pixel circuit further comprises a first transistor, and the photodiode is coupled to the first voltage signal line through the first transistor; and
wherein the method comprises:
controlling the data writing transistor to be turned on and detecting a voltage value on one data line of the at least one data line; and
determining a position of an optical touch signal based on the voltage value.

17. The method according to claim 16, wherein said detecting the voltage value on the one data line of the at least one data line comprises:
providing a data signal to the one data line, and detecting the voltage value on the data line; and
said determining the position of the optical touch signal based on the voltage value comprises:
in response to an absolute value of a difference between the voltage value and a voltage value of the data signal being greater than a preset voltage value, determining that the photodiode corresponding to the data signal generates a photocurrent; and
determining the position of the optical touch signal based on a position of the photodiode generating the photocurrent.

18. The method according to claim 16, further comprising:
controlling an operation cycle of the one pixel circuit to comprise a data writing phase,
wherein said controlling the data writing transistor to be turned on, and detecting the voltage value on the one data line comprises controlling the data writing transistor to be turned on in the data writing phase.

19. A display apparatus, comprising:
a display panel,
wherein the display panel comprises:
- at least one pixel circuit;
- at least one light-emitting device coupled to the at least one pixel circuit;
- at least one data line; and
- a first voltage signal line, wherein one pixel circuit of the at least one pixel circuit comprises a data writing transistor and a photodiode; the data writing transistor comprises a first electrode coupled to one of the at least one data line and a second electrode coupled to a first electrode of the photodiode; and the photodiode further comprises a second electrode coupled to the first voltage signal line, and wherein the one pixel circuit further comprises a first transistor, and the photodiode is coupled to the first voltage signal line through the first transistor.

* * * * *